US009287023B2

(12) United States Patent
Hansen et al.

(10) Patent No.: US 9,287,023 B2
(45) Date of Patent: Mar. 15, 2016

(54) ELECTRICALLY CONDUCTIVE NANOCOMPOSITE MATERIAL

(71) Applicants: George Clayton Hansen, Midway, UT (US); Nathan D. Hansen, Heber, UT (US); Lauren Hansen, Midway, UT (US)

(72) Inventors: George Clayton Hansen, Midway, UT (US); Nathan D. Hansen, Heber, UT (US); Lauren Hansen, Midway, UT (US)

(73) Assignee: Conductive Composites Company, LLC, Heber City, UT (US)

( * ) Notice: Subject to any disclaimer, the term of this patent is extended or adjusted under 35 U.S.C. 154(b) by 459 days.

(21) Appl. No.: 13/747,647

(22) Filed: Jan. 23, 2013

(65) Prior Publication Data

US 2013/0134364 A1    May 30, 2013

Related U.S. Application Data

(60) Division of application No. 12/261,006, filed on Oct. 29, 2008, now Pat. No. 8,361,608, which is a continuation-in-part of application No. 10/414,266, filed on Apr. 15, 2003, now Pat. No. 7,935,415.

(Continued)

(51) Int. Cl.
*C04B 35/04* (2006.01)
*H01F 1/00* (2006.01)
*H01F 1/28* (2006.01)
(Continued)

(52) U.S. Cl.
CPC .............. *H01B 13/00* (2013.01); *B29C 70/14* (2013.01); *B29C 70/882* (2013.01); *D04H 3/002* (2013.01); *D04H 5/00* (2013.01); *Y10T 428/249931* (2015.04); *Y10T 428/249933* (2015.04)

(58) Field of Classification Search
CPC ...... B29C 70/00; B29C 70/882; C09D 5/008; C09D 5/1625; B22F 1/004; B22F 9/24
USPC ................ 252/62.54; 428/294.4, 295.1, 605; 501/35
See application file for complete search history.

(56) References Cited

U.S. PATENT DOCUMENTS 3,570,829 A    3/1971 Schladitz
3,607,608 A *  9/1971 Siefert ........................... 501/35
(Continued)

OTHER PUBLICATIONS

"Sumitomo Electric Develops Metal Nano-Powder for Electronic Devices," SEI News website, Dec. 2001, 2 pages.

*Primary Examiner* — Khanh Tuan Nguyen
(74) *Attorney, Agent, or Firm* — Madson IP, P.C.

(57) ABSTRACT

An electromagnetically active composite has an electrically-nonconductive host matrix and electrically-conductive nanostrand bodies embedded in a substantially uniform distribution throughout the host matrix. Each of the nanostrand bodies comprises a volume containing at least one nanostrand of filamentary metal. Adjacent nanostrand bodies that are sufficiently mutually proximate will interact electromagnetically with each other. The filamentary metal of the one or more nanostrands in each of the nanostrand bodies occupies a deminimus fraction of the overall volume occupied by the at least one nanostrand that comprises each of the nanostrand bodies. The filamentary metal is chosen from among the group of metals that includes nickel, nickel aluminides, iron, iron aluminides, alloys of nickel and iron, and alloys of nickel and copper. Individual nanostrands of the nanostrand bodies have an average diameter in a range of from about 10 nanometers to about 4000 nanometers, and the average diameter of the nanostrand bodies is in a range of from about one micron to about 3000 microns.

12 Claims, 12 Drawing Sheets

Related U.S. Application Data

(60) Provisional application No. 60/373,363, filed on Apr. 17, 2002, provisional application No. 60/412,662, filed on Sep. 20, 2002, provisional application No. 60/983,821, filed on Oct. 30, 2007, provisional application No. 60/990,443, filed on Nov. 27, 2007.

(51) Int. Cl.
| | |
|---|---|
| *H01B 13/00* | (2006.01) |
| *B29C 70/88* | (2006.01) |
| *B29C 70/14* | (2006.01) |
| *D04H 5/00* | (2012.01) |
| *D04H 3/002* | (2012.01) |

(56) References Cited

U.S. PATENT DOCUMENTS

| | | |
|---|---|---|
| 4,664,309 A | 5/1987 | Allen et al. |
| 5,130,204 A | 7/1992 | Jenkin |
| 5,830,548 A | 11/1998 | Andersen et al. |
| 5,843,329 A * | 12/1998 | Deetz .................. 252/62.54 |
| 6,375,703 B1 | 4/2002 | Chou et al. |
| 6,528,572 B1 | 3/2003 | Patel et al. |
| 2005/0022698 A1 | 2/2005 | Mazany et al. |

* cited by examiner

US 9,287,023 B2

ELECTRICALLY CONDUCTIVE NANOCOMPOSITE MATERIAL

CROSS-REFERENCED RELATED APPLICATIONS

This patent application claims the benefit of U.S. Provisional Patent Application Ser. No. 60/983,821 that was filed on Oct. 30, 2007, for an invention titled ELECTICALLY CONDUCTIVE NANOCOMPOSITES WITH ADDED MULTIFUNCTIONALITY.

This patent application claims the benefit of U.S. Provisional Patent Application Ser. No. 60/990,443 that was filed on Nov. 27, 2007, for an invention titled. MULTI-DIMENSIONAL AND BRANCHED NANOSTRUCTURED ELECTRICAL CONDUCTORS AND METHODS FOR DISPERSING THE SAME.

This patent application is a divisional application of prior U.S. patent application Ser. No. 12/261,006 that was filed on Oct. 29, 2008, for an invention titled ELECTRICALLY-CONDUCTIVE NANOCOMPOSITE MATERIAL (hereinafter the "CIP Application"). The CIP application is a continuation-in-part application of prior U.S. patent application Ser. No. 10/414,266 that was filed on Apr. 15, 2003, for an invention titled ELECTRICALLY CONDUCTIVE COMPOSITE MATERIAL (hereinafter the "Parent Application"). The Parent Application in turn claims the benefit both, of U.S. Provisional Application Ser. No. 60/373,363 that was filed on Apr. 17, 2002, for an invention titled METAL NANOSTRAND MATERIAL, and of U.S. Provisional Application Ser. No. 60/412,662 filed on Sep. 20, 2002, for an invention titled NICKEL NANOSTRANDS. Each of the applications mentioned in the foregoing paragraphs are hereby incorporated herein this reference.

This patent application contains subject matter related to or identical with that in U.S. patent application Ser. No. 12/260,999 that was filed on Oct. 29, 2008, for an invention titled LIGHTNING STRIKE AND ELECTROMAGNETIC PROTECTION SYSTEM, which is hereby incorporated herein by this reference.

BACKGROUND OF THE INVENTION

1. Field of the Invention

The present invention relates to the general concept that electrically non-conductive materials, such as polymers, can be made conductive by adding a conductive material. More specifically, the present invention relates to understanding the influence that the shape, size, diameter, aspect ratio, branching and three dimensional interconnectivity of the additive conductive material has on overall material properties. Moreover, the importance of the preservation of the aspect ratio, branching, and interconnectivity in the final mixture is discussed.

2. Background

The process of adding conductive particles to a non-conductive medium, such as a polymer, to obtain a more conductive result is well known. Historically, the conductive additives are typically of the form of a sphere, plate, flake, rod, fiber, nanofibers, nanotubes, and so forth. These additive particles can vary in basic conductivity (such as ranging from carbon to nickel to copper to silver), size (from tens of millimeters to tens of nanometers), shape (such as plates, rods, or spheres, each format having its own associated packing factor), and most importantly, aspect ratio (the ratio of length to diameter). The essential concept in adding these conductive particles is to use them to increase the conductivity of the overall mixture of the non-conductor substrate that they are combined with, and also to alter the conductive nature of the substrate itself.

The following metals are exemplary of what is typically used by the current state of the art for conductive particles. Silver (Ag) is very highly conductive, but is also expensive, susceptible to corrosion, and has a high density. Copper (Cu) is highly conductive and has found widespread use in many applications, but is also susceptible to corrosion. Nickel (Ni) is a bit less conductive and moderately priced, with the added benefits of magnetism and corrosion resistance. Carbon (C) is not as conductive, but is also relatively inexpensive. Carbon nanofibers and nanotubes are very expensive; and while they individually are very conductive, they are not as conductive as anticipated when added to a polymer. This is because they are very difficult to evenly disperse and create a conductive network.

Combinations of these metals are sometimes used to find the right combination of required properties.

BRIEF SUMMARY OF THE INVENTION

The present invention is an electromagnetically active composite. The composite has an electrically-nonconductive host matrix and electrically-conductive nanostrand bodies embedded in a substantially uniform distribution throughout the host matrix. Each of the nanostrand bodies comprises a volume containing at least one nanostrand of filamentary metal. Also, adjacent nanostrand bodies that are sufficiently mutually proximate will interact electromagnetically with each other.

Further, the filamentary metal of the one or more nanostrands in each of the nanostrand bodies occupies a deminimus fraction of the overall volume occupied by the at least one nanostrand that comprises each of the nanostrand bodies. The filamentary metal is chosen from among the group of metals that includes nickel, nickel aluminides, iron, iron aluminides, alloys of nickel and iron, and alloys of nickel and copper.

Individual nanostrands of the nanostrand bodies have an average diameter in a range of from about 10 nanometers to about 4000 nanometers, and the average diameter of the nanostrand bodies is in a range of from about one micron to about 3000 microns.

The host matrix can comprise either a polymeric material or a ceramic material.

The composite may also include an additive distinct from the nanostrand bodies that is dispersed throughout the host matrix and lends non-electromagnetic properties to the composite. This additive, for example, may include pigments, lubricants, hard particles, thermal conductors, surface smoothers, flame retardants, gelling agents, and chopped nickel-coated macro scale fibers or any other suitable additive.

To make an electromagnetically active composite, the nanostrand bodies are instrumental in imparting electromagnetic activity to an electrically-nonconductive host matrix. The electrically-conductive nanostrand bodies are formed and then combined with the host matrix such that the nanostrand bodies are distributed uniformly throughout the host matrix so that adjacent of nanostrand bodies can be sufficiently mutually proximate to interact with each other electromagnetically. The nanostrand bodies are highly-branched, three-dimensional, open chains, and the open chains should remain uncollapsed following the steps of combining and distributing.

Optimally, shear forces that may be imposed on the nanostrand bodies by the host matrix should be minimized. This can be done by lowering the viscosity of the host matrix and/or by controlling the shear velocity of the host matrix.

Additionally, a preform can be made to impart electromagnetic activity to a composite structure. Again, electrically-conductive nanostrand bodies are formed. Such nanostrand bodies may be formed of nickel, nickel aluminides, iron, iron aluminides, alloys of nickel and iron, and alloys of nickel and copper. These electrically-conductive nanostrand bodies are suspended in a fluid carrier and then delivered against a forming surface. By then drying the fluid carrier from the nanostrand bodies the perform remains.

A gelling agent may also be introduced into the fluid carrier to facilitate the perform holding its form.

The fluid carrier may be either water or a solvent or any other suitable fluid that can be dried without damaging the nanostrand bodies or the preform.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
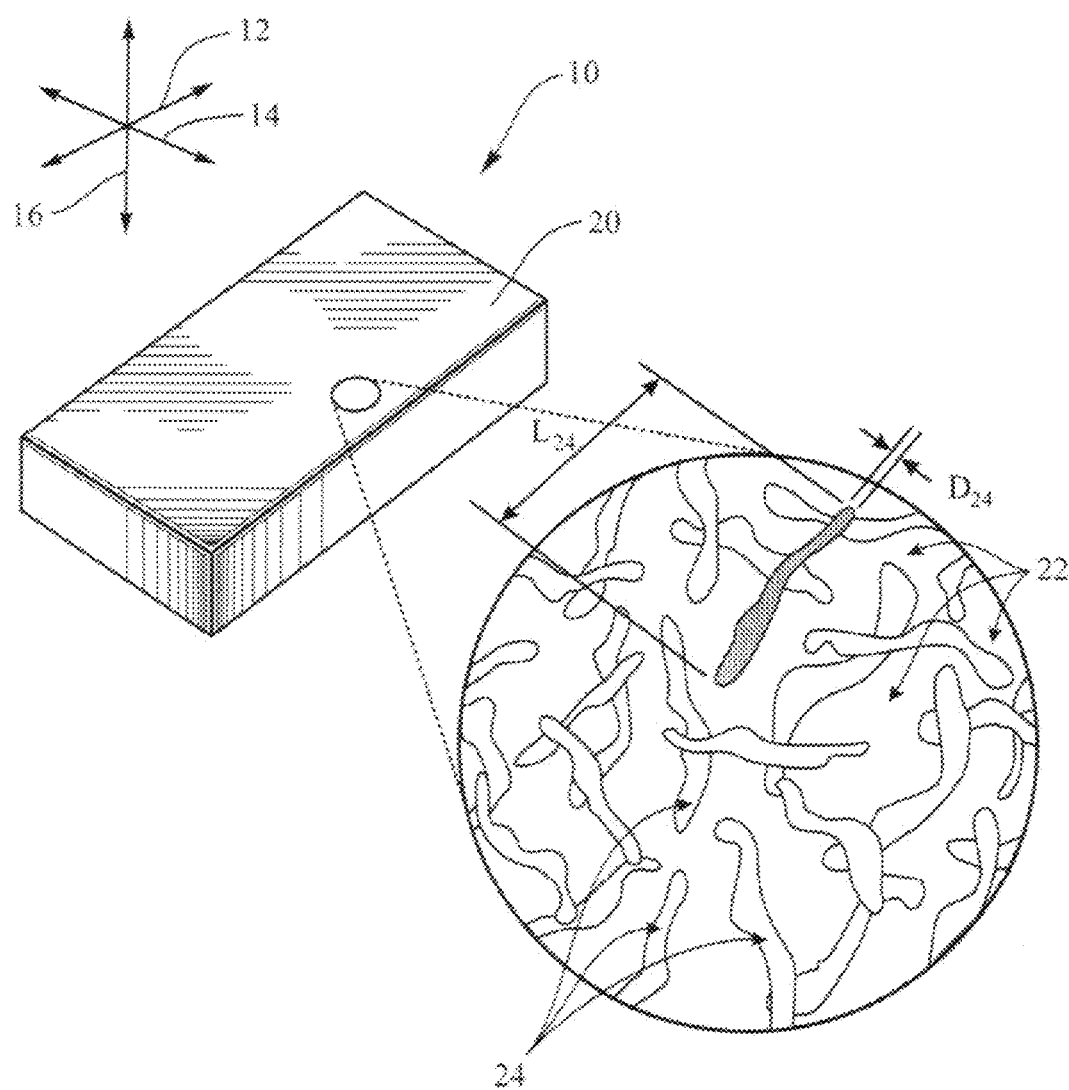
FIG. 1 is a perspective view with an accompanying inset of an article formed from a first embodiment of a composite material incorporating teachings of the present invention, the insert illustrating in microscopic perspective graphically streamlined nanostrands distributed in the host matrix of the composite material.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1-12, is not intended to limit the scope of the invention, as claimed, but is merely representative of presently preferred embodiments of the invention.

The fundamental problem with previously used materials and approaches is that they all depend on linear or curvilinear conduction across, around or along the surface or volume, while the current seeks the limited opportunities to connect to the neighboring conductor. Many of these additives, particularly the lower aspect ratio materials also displace a significant volume in order to achieve required conductivity levels. Furthermore, of all of the shapes discussed above, none are branched, nor are any of them three dimensionally physically interconnected.

Therefore, if one could create a conductive additive that did not require as much volume displacement, or if one could create a material that had a branched, looped, and three-dimensionally physically interconnected geometry, one would begin to accomplish a goal of reducing volume displacement, while maintaining or even increasing conductive performance, by increasing the number and diversifying the direction of multiple concurrent opportunities for conductivity. Furthermore, if one could build this particle out of a material that also exhibited corrosion resistance and magnetic capabilities, one would have a particle that promised to solve many problems the practice of using additive conductive particles.

Nickel nanostrands are a sub-micron diameter, highly conductive, high aspect ratio, branched, looped, three-dimensionally interconnected, magnetic, corrosion resistant nanostructure that can be used as a conductive particle to lend electromagnetic properties to an otherwise electrically-nonconductive host matrix. The manufacture of nickel nanostrands is described in U.S. Pat. No. 5,130,204 Jenkin, which is hereby is incorporated herein by reference.

The present invention teaches that that the preservation of a three-dimensionally interconnected and branched geometry in nanostrands allows for the optimal preservation of electrical conductivity. There is a science that is predictable and teachable concerning the correct method by which to mix and disperse nanostrands. Nanostrands are quite brittle, being formed as chains of metal crystallites. Using nanostrands, electrical conductivity can be achieved that is several orders of magnitude higher that have previously been achieved with other electrically-conductive additive particles.

Nickel nanostrands work well in creating higher electrical conductivity with lower volume percent loadings when compared to the other additives. For instance, in any given polymer, nanostrands are about two orders of magnitude more conductive that carbon nanofibers, on an equal volume basis. As another example, polymer films of nanostrands are just as conductive as films filled with silver coated spheres, but at one third the thickness.

A reason why nanostrands are superior to other conductive particles is due to high aspect ratios and the branches extending normal to the longitudinal direction of the dimension of high aspect ratio. This geometry creates a multiplicity of sub-micron electrically-conductive paths.

Nanostrands can be inserted as groups of bundles of individual branched and looped strands. These bundles loosely resemble a "cotton ball" in that there is a bulk of material with many extensions radial from the center of the bulk. The exception to this analogy is that a cottonball is made up of curvilinear fibers. Perhaps a better analogy is to compare a nanostrand to the skeletal skinny branched grape vine that remains after a bunch of grapes are plucked. However, even that analogy does not show the three dimensional looping and interconnects of the nanostrands.

These bundles can then be placed in proximity to each other such that a desired conductivity level is achieved for the bulk of the material in which they are inserted, much like shrubs growing close to each other, such that they overlap and obscure the background to a desired level.

The presence of the looping, interconnecting mam strands, and branches of the Nanostrand structure affords many unique performance benefits. The fundamental improvement is that less volume must be displaced (and therefore less conductive particle is required) to achieve the same (or better) conductivities of the other solid particle geometries previously discussed.

Electrically-conductive particles that may be added to a host polymer matrix to increase electrical conductivity include, but are not limited to carbon, carbon black, graphite, many metals, and a variety of metal-coated particles, such as nickel-coated graphite, or silver coated nickel, nickel-copper, copper, silver, silver coated glass spheres, etc. These materials perform well, but their size and aspect ratio are such that significant volumetric quantities are required in order to achieve electrical percolation. These heavy volumetric loadings subsequently detract from the bulk mechanical properties and result in processing difficulties, heavy weight penalties, and higher cost and material use.

More recently, the art of adding conductive nanoparticles to a polymer has resulted in even better conductivity, as their decreasing diameter allows for a higher number of the particles to achieve a more intimate electrical contact. Thus even better levels of conductivity can be achieved at similar or lower volume loadings.

In addition to decreasing diameters, many nanomaterials are produced with a high aspect ratio, such as carbon nanotubes and carbon nanofibers. These materials take advantage not only of the small diameter concept, but add to that the concept of high aspect ratio. A higher aspect ratio permits conductive charges to be transported for long distances before being required to experience the resistance loss that occurs when passing a signal to a neighboring conductor. That is, the path to travel a given distance will require fewer interconnections between individual particles if the particles have in increase in aspect ratio. In addition, the high aspect ratio allows the multiplicity of conductors to often make contact with other conductors at several placed down their length, resulting in even easier electrical transport.

But all of the above described electron transport methods are principally linear through or along the individual conductors.

In addition to decreasing diameters and increasing aspect ratios, a small diameter, high aspect ratio metallic material known in the industry as nickel nanostrands brings the additional property of being highly branched and thus even more able to reach out and transport electrical conductivity through a multiplicity of three dimensionally placed branches that interconnect and intertwine. For this reason, along with the fact that they are made of a pure metal (in this case nickel) these branched materials are the best at achieving the highest ultimate conductivity at the lowest volume fraction loadings. In general, on an equal volume-loading basis, branched nickel nanoscale materials are usually about two orders of magnitude more conductive than carbon nanoscale materials.

FIG. 1 is a perspective view of an article 10 formed from a first embodiment of a composite material 20 incorporating teachings of the present invention. While article 10 assumes an arbitrary, rectangular shape in FIG. 1, article 10 can be formed into other shapes without departing from those teachings. Article 10 has a longitudinal direction 12, a lateral direction 14, and a transverse direction 16. Composite material 20 provides a relatively high degree of electrical conductivity, thereby to enable electrical current to flow through article 10 with comparatively low resistance.

As shown in the inset included in FIG. 1, composite material 20 includes an electrically-nonconductive matrix 22 in which a plurality of graphically streamlined nanostrands 24 are distributed in a generally random orientation. Streamlined nanostrands 24 are not shown to branch in a manner that is typical in many types of nanostrands.

Matrix 22 may be a nonmetallic material such as a polymer, a ceramic, or an elastomer. Matrix 22 may, however, include various additives or be a combination of multiple materials. Polymers that have found to possess enhanced electrical conductivity when combined with metallic nanostrands include epoxy, acrylic, water-based paints, urethanes, lacquers, silicone elastomers, and thermoplastics such as polyethylene, although matrix 22 is not limited to including these materials.

Graphically streamlined nanostrands 24 are made of a metal chosen from among the group of metals including nickel, nickel aluminides, iron, iron aluminides, alloys of nickel and iron, and alloys of nickel and copper. As shown, a typical graphically streamlined nanostrand 24, which is stippled in FIG. 1, has an average diameter $D_{24}$ and an average length $L_{24}$, that are each indicated by dimension lines tied to the inset of FIG. 1.

As used herein, the term "metallic" when applied to a nanostrand is intended to include a variety of structures made wholly or mostly of one or more metals. The term "metal" in this context is intended to exclude carbon; while carbon may be considered a metal in some fields, carbon with metals added thereto lacks sufficient conductivity to encourage its use as an electrical conductor in the context of the present invention.

Graphically streamlined nanostrands 24 typically exhibit an average diameter $D_{24}$ as small as 25 nanometers and as large as several microns, depending on the conditions of manufacture and the desired application. For some applications, average diameter $D_{24}$ ranges from about 0.5 microns to about 2 microns. In other embodiments, average diameter $D_{24}$ is about 1 micron. Proper selection of average diameter $D_{24}$ enhances the electrical conductivity lent to composite material 20 by the presence of streamlined nanostrands 24 in matrix 22. Average length $L_{24}$ of graphically streamlined nanostrands 24 ranges from about 0.1 micron to about 4 microns.

Graphically streamlined nanostrands 24 have an average aspect ratio, or length-to-diameter ratio, which is defined as the average length $L_{24}$ divided by the average diameter $D_{24}$. Graphically streamlined nanostrands 24 typically exhibit aspect ratios of at least 20-to-1, but often between about 50-to-1, and even about 500-to-1. In some cases, aspect ratios of thousands-to-1 have been observed. The use of graphically streamlined nanostrands 24 having greater aspect ratios may enhance the electrical conductivity of composite material 20, but longer aspect ratios also introduce practical limitations with respect to incorporating graphically streamlined nanostrands 24 into an article, such as article 10. Graphically streamlined nanostrands 24 having an aspect ratio over about 1000-to-1 may be difficult to disperse in a matrix, such as matrix 22. Thus, the average aspect ratio for graphically streamlined nanostrands 24 may advantageously range from about 10-to-1 to about 1000-to-1.

The aspect ratios of graphically streamlined nanostrands 24 are further limited by the type of process used to form article 10. Some manufacturing processes tend to sever nanostrands, thereby reducing the effective aspect ratio of nanostrands in a matrix produced by such processes. Article 10 may, in the alternative or in addition, include chopped fiber nanostrands, i.e., nanostrands with a deliberately limited average length $L_{24}$, and therefore a limited aspect ratio.

Electrical conductivity is afforded to composite material 20 through the use of comparatively low volumetric concentrations of graphically streamlined nanostrands 24. The volumetric concentration of graphically streamlined nanostrands 24 is the volume of graphically streamlined nanostrands 24 divided by the volume of composite material 20 in which that volume of streamlined nanostrands 24 is dispersed and embedded. For a matrix, such as matrix 22, the volumetric concentration of graphically streamlined nanostrands 24 may range from about 0.5% to about 30%, more narrowly from about 2% to about 20%, and most narrowly from about 5% to about 15%. Some factors that affect the volumetric concentration required include average diameter $D_{24}$, average aspect ratio, the degree of branching present, the nanostrands employed, and the surface chemistry, surface tension, and viscosity of those nanostrands and of matrix 22.

A large aspect ratio enhances the electrical conductivity of composite material 20. A relatively high degree of branching in the nanostrands employed promotes electrical conductivity using a low volumetric concentration of those nanostrands. Branching enhances the electrical and electromagnetic interconnections arising between and among individual nanostrands, thereby enhancing the number of pathways for electrical current and the number of electromagnetic links throughout composite material 20. In typical nanostrands, branching progresses to such an extent that branches close upon themselves or upon other parts of the same nanostrand, forming metal loops. Graphic representations of such branched and looped typical nanostrands are illustrated in FIG. 2.

In certain applications, it is desirable to lend electrical conductivity to an article that is formed of an electrical-nonconductive material without altering the interior structure of the material. Such a procedure is useful in modifying existing equipment to provide conductive surfacing, as in the case of electromagnetic shielding. Furthermore, such a procedure is useful for articles that cannot reasonably be constructed of a solid composite material. One embodiment of a composite material that can be applied to a surface will be shown and described also in connection with FIG. 2.

Figure 2:
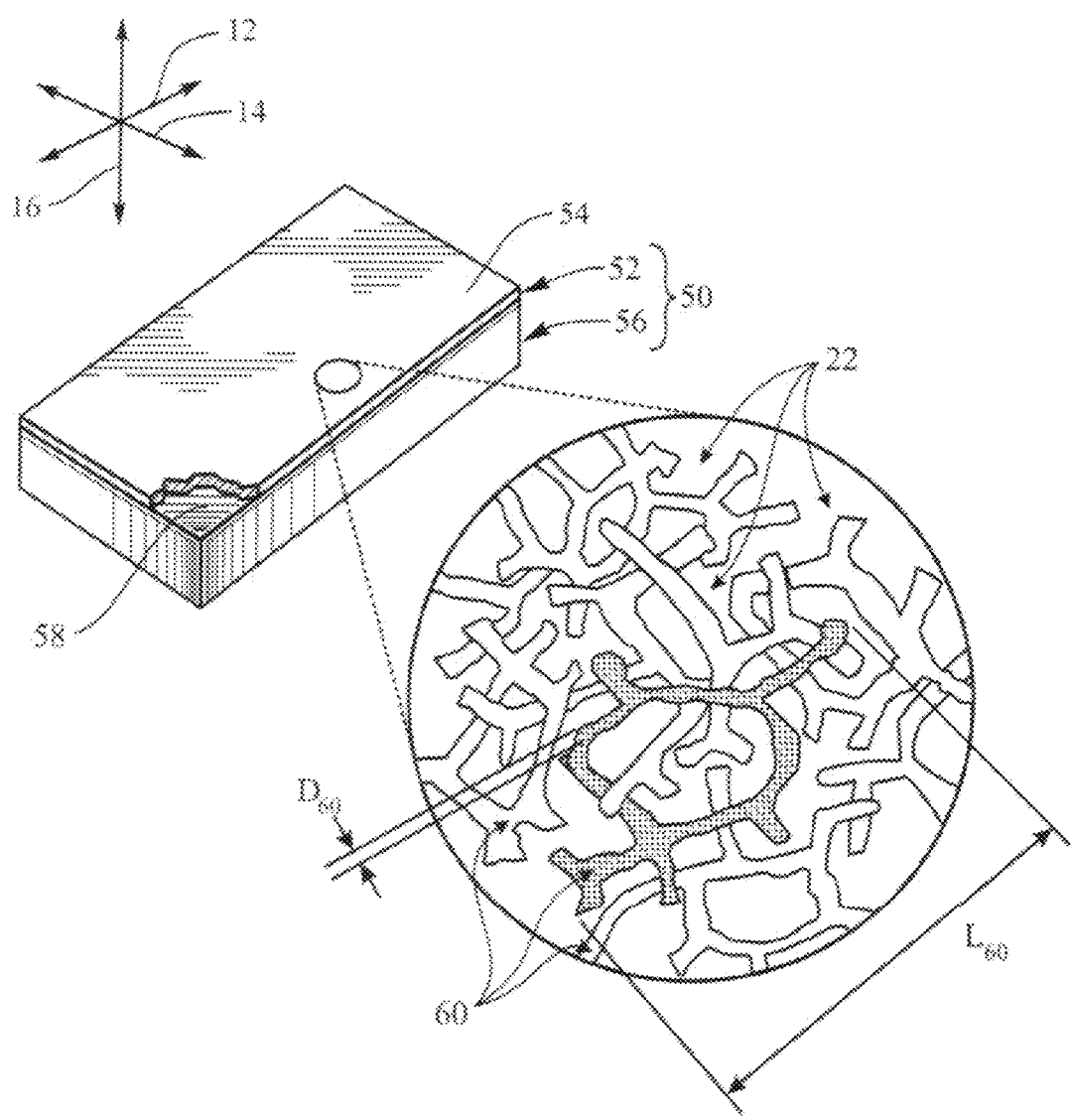
FIG. 2 is a perspective view with an accompanying inset of an article formed from a second embodiment of a composite material incorporating teachings of the present invention, the insert illustrating in microscopic perspective, as being distributed in the host matrix of the composite material, nanostrand bodies and typical nanostrands therein that exhibit branching and looping.

FIG. 2 is a perspective view of an article 50 for incorporation into the surface of an assembly. Article 50 includes a surface layer 52 formed from a third embodiment of a composite material 54 incorporating teachings of the present invention. As shown, article 50 also includes a base structure 56 that is made from a material exhibiting electrical conductivity inadequate to dissipate lightning strike energy and shield from the associated electromagnetic energy the interior of article 50 and any assembly into which article 50 is incorporated. Base structure 56 has an outer face 58 that would be exposed at the surface of the assembly, when article 50 is incorporated thereinto. For the purpose of providing lighting protection to base structure 56 and to article 50, the electrical conductivity of outer face 58 has been enhanced by the application thereto of composite material 54.

Figure 3:
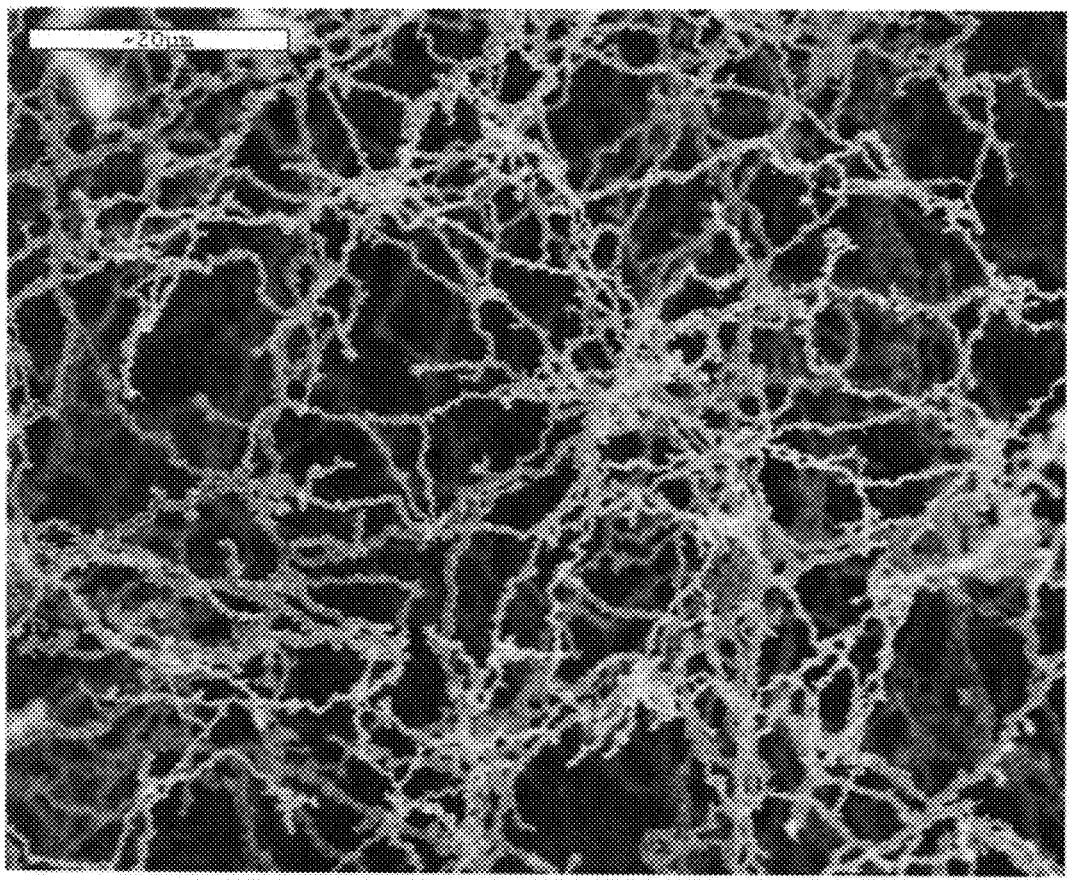
FIG. 3 is a microscopic scale photograph of nanostrands as produced, exhibiting the submicron diameter, high aspect ratio, high degree of random branching, and looping that produce advantageous three-dimensional electromagnetic interconnectivity.

As shown in the inset included in FIG. 2, composite material 54 includes an electrically-nonconductive matrix 22 in which a plurality of typical nanostrands 60 are dispersed and embedded. The branches of typical nanostrands 60 are extensive to a degree that many form loops of metal in the lattice structure of typical nanostrands 60. This is routine in nanostrands made of metals. Typical nanostrands 60 are shown in FIG. 3 to have an average diameter $D_{60}$ and an average length $L_{60}$.

Proximity is essential to conductive transfer; therefore having the particles closer together will give better conduction. Therefore, higher loadings of conductive particles are required for higher conduction. Furthermore, particles of smaller diameter also allow for closer packing and more opportunities for particle to particle conduction.

The concept of aspect ratio is generally more important than the concepts of material, size and shape. In comparison of the particles in terms of aspect ratio alone, fiber has the highest aspect ratio, followed by the rod, then the plate, then the sphere. A high aspect ratio allows for much longer conductive paths between individual conductors, and allows for more and multiple points of contact between conductors.

It may also be preferable for certain electromagnetic or magnetic applications that the conductor have magnetic properties. For certain environments, it may also be desirable for the conductor to be more noble (corrosion resistant). In applications where either of these concepts is important, nickel has a distinct advantage over copper, silver and carbon.

FIG. 3 is a microscopic scale photograph of nanostrands as produced, exhibiting the submicron diameter, high aspect ratio, high degree of random branching, and looping that produce advantageous three-dimensional electromagnetic interconnectivity. When mixing, it is important to understand that the shear forces in the host fluid must be kept as low as possible, through a combination of reducing the media viscosity (by either increasing the temperature or adding solvents), and/or reducing the mixing speed. High shear or blade mixing methods are generally inappropriate. The best method so far characterized has been by a double planetary centrifugal mixer, such as a Thinky brand mixer.

As an example, the following figures illustrate the microscopic (100×) progression of the mixing process as a function of mixing time; i.e. pre-mixed, 5 seconds, 10 seconds, 20 seconds, 30 seconds and 60 seconds. A very low concentration of 1% by volume of nanostrands was used, in order to be able to observe the distribution of individual nanostrands via transmitted light microscopy. The mixing time is very dependent upon the size of the batch to be mixed, and increases with batch size. These mixing time used here are only relative to the small size of the batches herein analyzed. A larger batch would require commensurately more time to mix, but the concepts of dispersion remain the same. Rotational mixing speed is also an important parameter, but was held at a constant 2000 rpm for this illustration.

Figure 4:
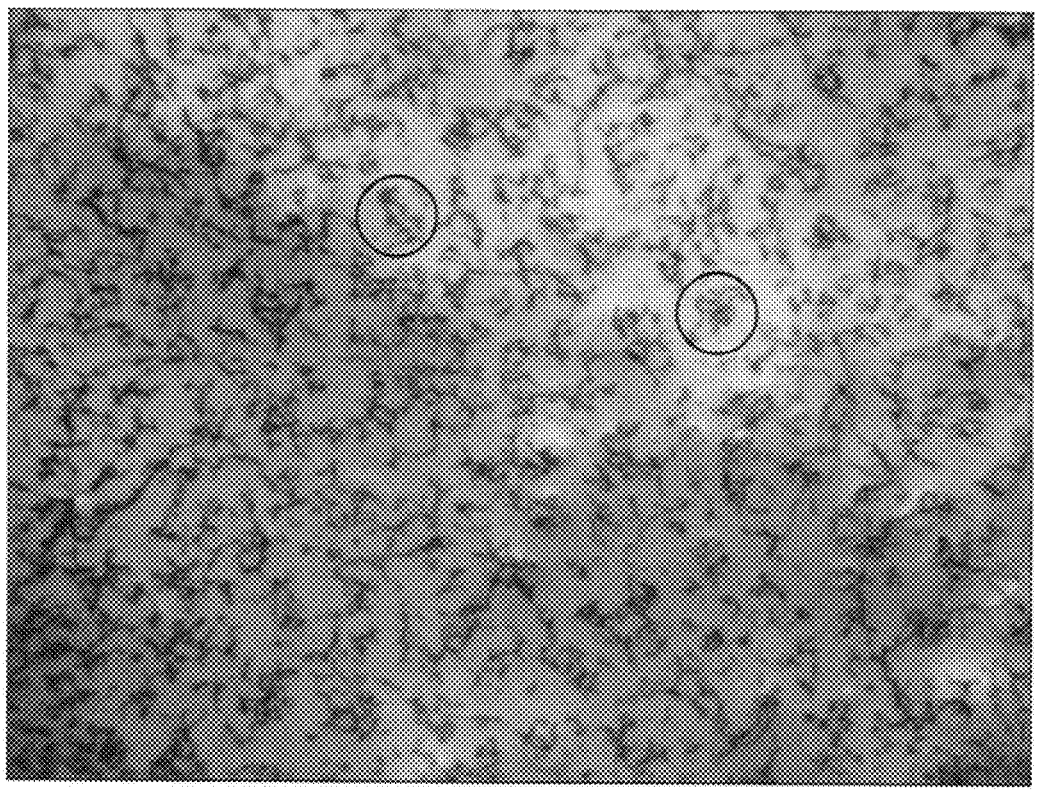
FIG. 4 is a microscopic scale photograph of nanostrands dispersed In a low concentration of about 0.5% by volume in a host matrix, thereby to exhibit in overlain circles selected typical individual nanostrands.

FIG. 4 is a microscopic scale photograph of nanostrands dispersed in a low concentration of about 0.5% by volume in a host matrix, thereby to exhibit in overlain circles selected typical individual nanostrands.

Figure 5A:
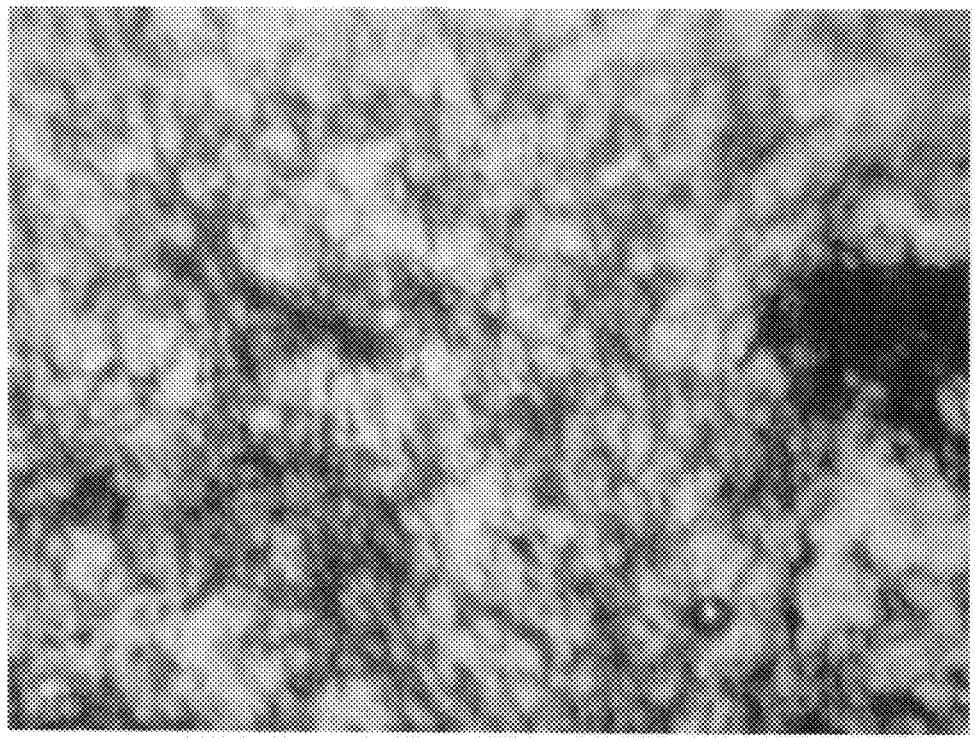
FIG. 5A is a microscopic scale photograph of nanostrands that have been initially gently combined by into a polymer matrix, but have yet to be dispersed throughout the matrix.

FIG. 5A is a microscopic scale photograph of nanostrands that have been initially gently combined into a polymer matrix, but have yet to be dispersed throughout the matrix.

Figure 5B:
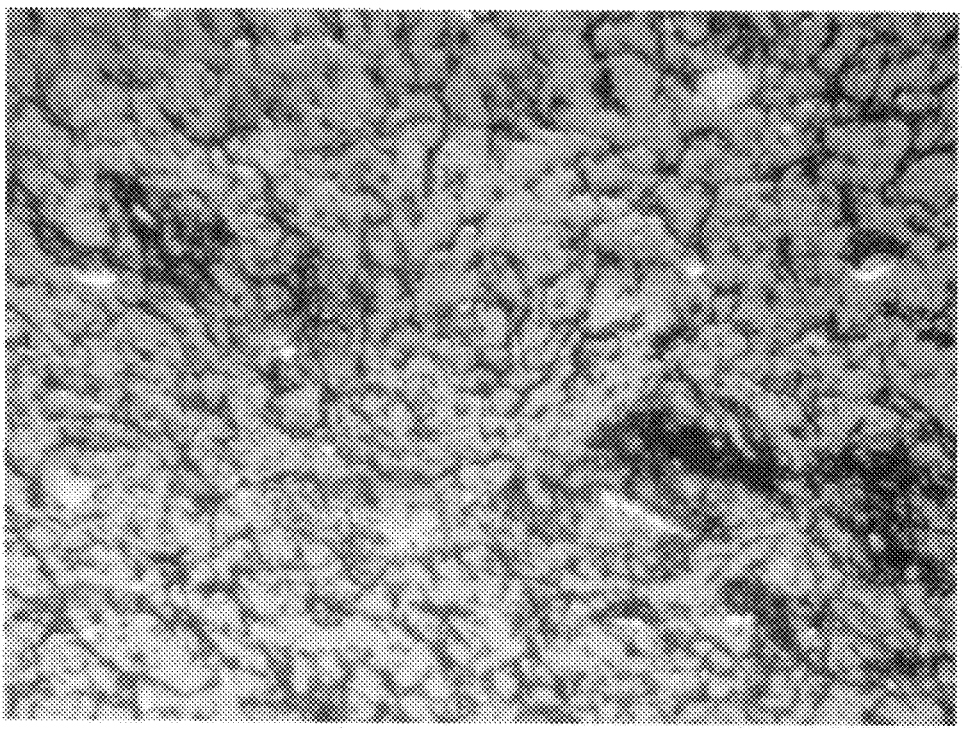
FIG. 5B is 5 seconds of medium shear yet incomplete mixing, whereby the nanostrands are generally disbursed, but a few larger agglomerates remain.

FIG. 5B is 5 seconds of medium shear yet incomplete mixing, whereby the nanostrands are generally dispersed, but a few larger agglomerates remain.

Figure 5C:
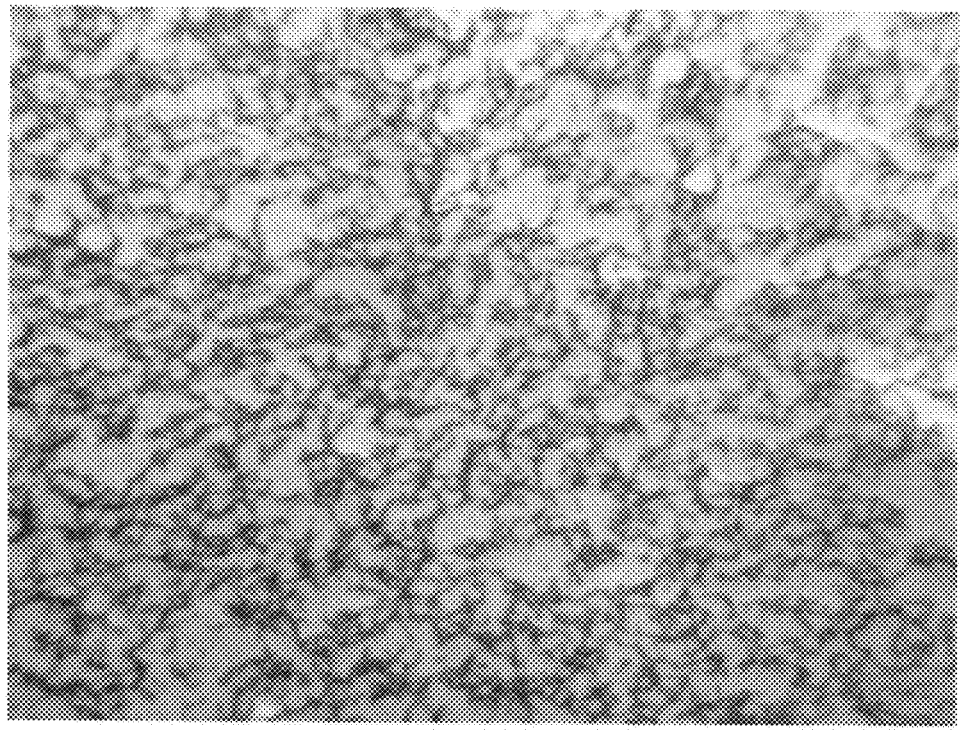
FIG. 5C is the mixture of FIG. 5A after 10 seconds of complete mixing into a polymer matrix.

FIG. 5C is the mixture of FIG. 5A after 10 seconds of complete mixing into a polymer matrix. Note the preservation of the separate "islands" or "cottonballs" of the bulk bodies of nanostrand particles that retain a significant amount of branching, looping, and three-dimensional conductivity. Unlike single dimensional fibers or particles, electrons are allowed to flow throughout these bodies quite freely in multiple dimensions and paths. It is when these bodies come in proximity to each other, and also in appropriate distance to polymer chains, that conductivity is achieved in the polymer. Notice that, unlike a particle, these bodies are still mostly open space, thus allowing for the interlocking infusion of the polymer matrix.

The size of these "cottonballs" can be engineered, and generally work best in the size range from 10 to 1000 microns, more or less. The size of the cottonballs is controlled by two basic methods 1) screening of the dry nanostrands, and/or screening of the polymer/nanostrand mixture, and 2) breaking up of the cottonballs by viscous shear forces during the mixing. Of these two actions, the shear forces are the most critical to control, as there is a window, above which the cottonballs are too large for good dispersion and functionality, and below which the cottonballs are too small, and start to approximate single nanostrands.

Figure 5D:
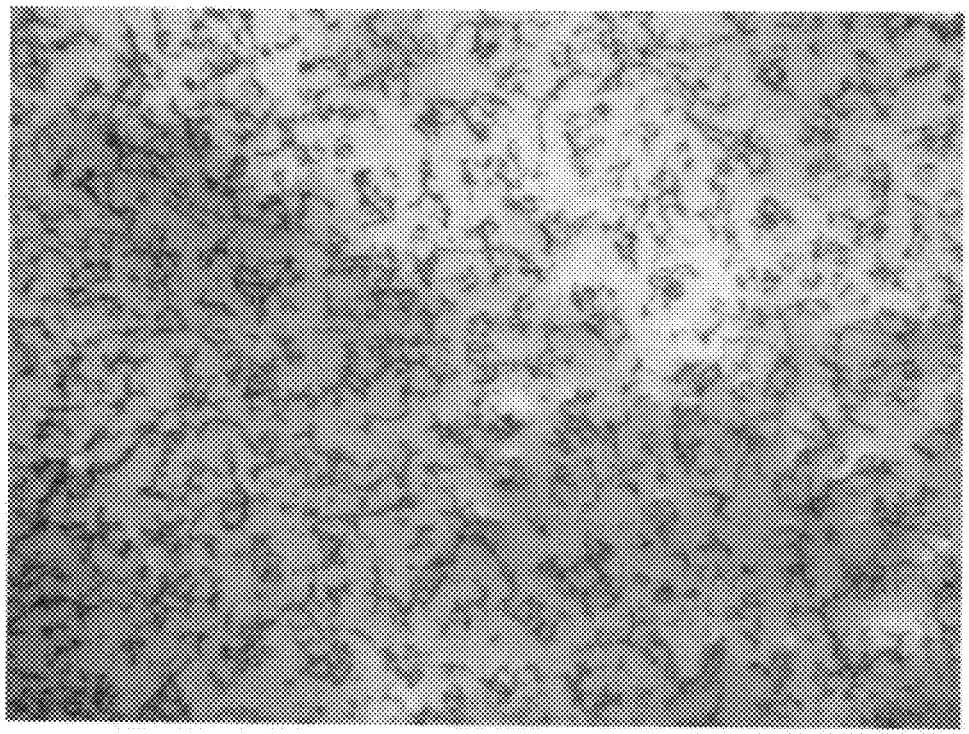
FIG. 5D is the mixture of FIG. 5A revealing the degrading effects on nanostrands of mixing overly long for 20 seconds.

FIG. 5D is the mixture of FIG. 5A revealing the degrading effects on nanostrands of mixing overly long for 20 seconds. As the nanostrands are comprised of chains of nickel crystals, they end up losing a good portion of their interconnectivity and branching as these chains are broken by excessive mixing. Though good conductivity can be obtained with nanostrands in this format, they are not as good as the conductivity of the 'preserved cottonballs' method.

Figure 5E:
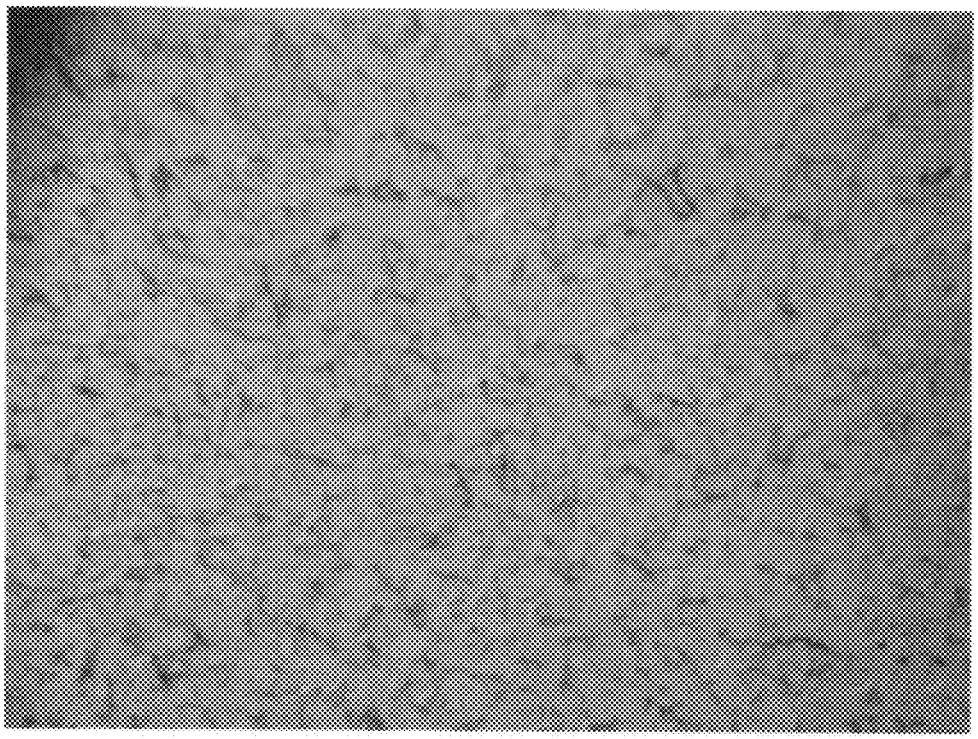
FIG. 5E is the mixture of FIG. 5A revealing the degrading effects on nanostrands of mixing overly long for 30 seconds.

FIG. 5E is the mixture of FIG. 5A revealing the degrading effects on nanostrands of mixing overly long for 30 seconds. Observe that the nanostrands are mostly ripped apart into their individual backbone chains, though some degree of branching is preserved.

Figure 5F:
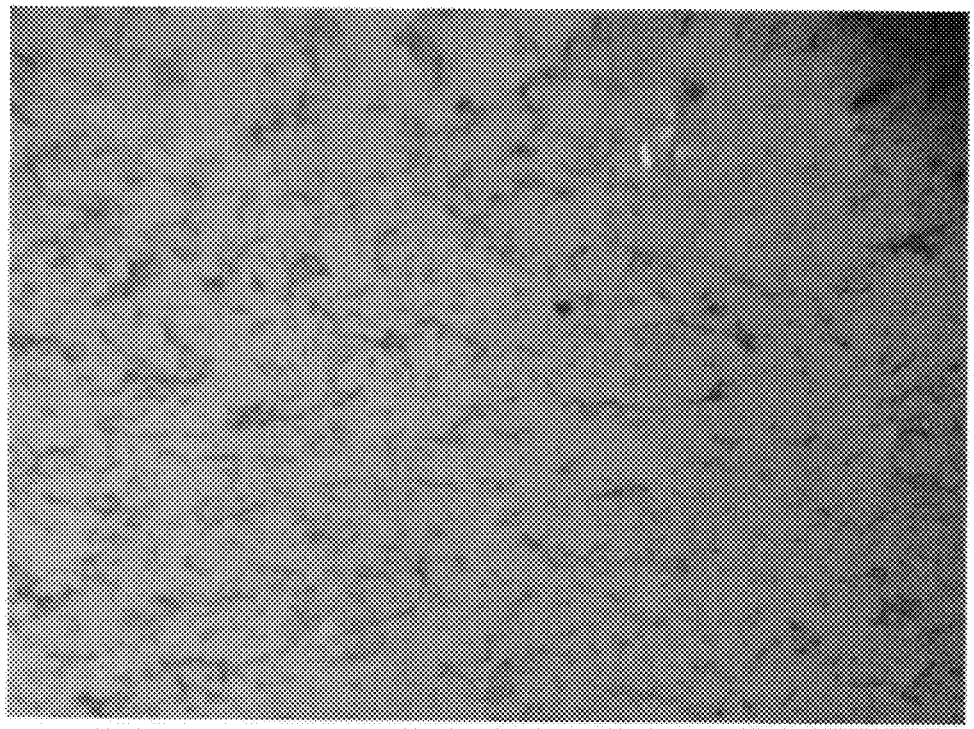
FIG. 5F is the mixture of FIG. 5A revealing the degrading effects on nanostrands of mixing overly long for 60 seconds.

FIG. 5F is the mixture of FIG. 5A revealing the degrading effects on nanostrands of mixing overly long for 60 seconds. Notice that most of the population has been not only reduced to individual strands, but that they are also becoming much shorter in average length. By this point, much of the conductivity of the mixture has been lost.

Figure 6:
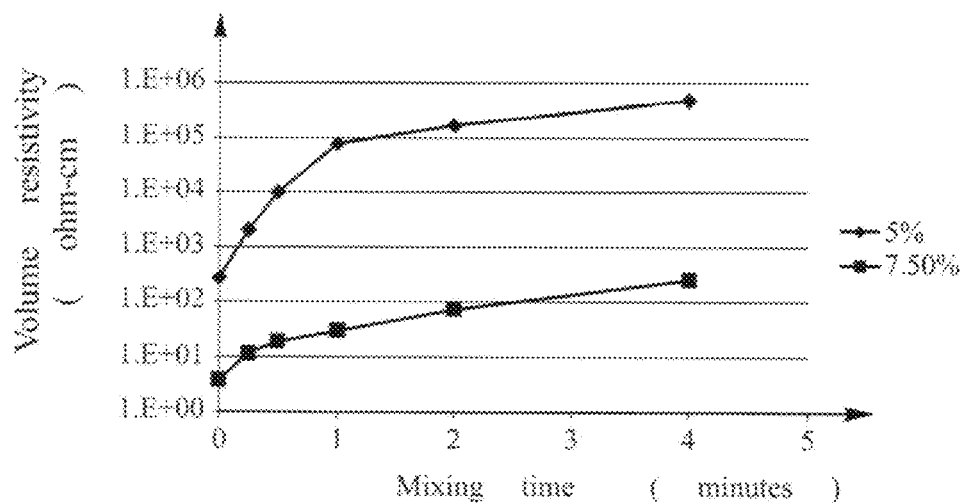
FIG. 6 is graph illustrating loss arising in electrical conductivity as mixing time Increases.
Figure 7:
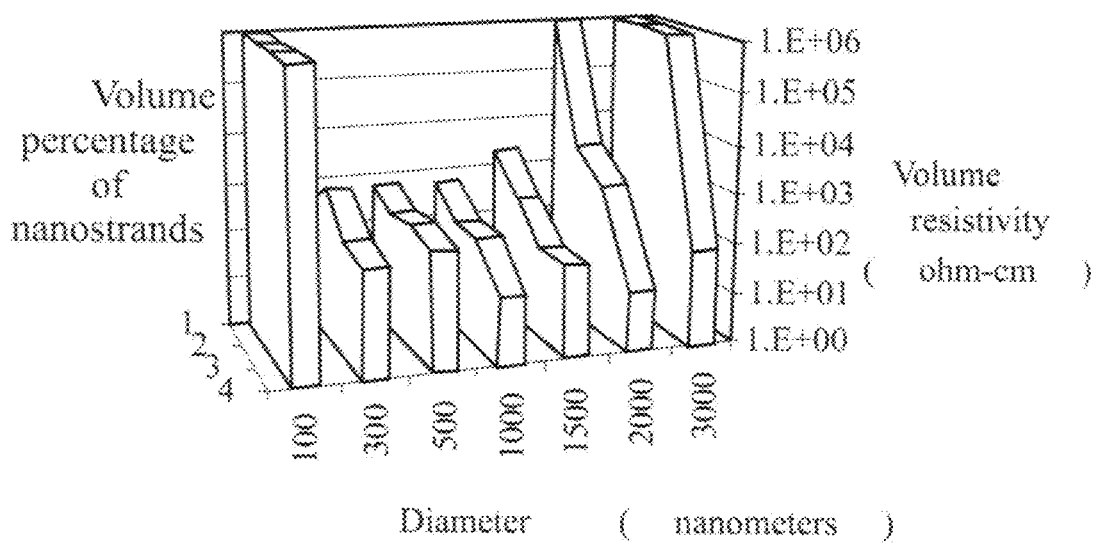
FIG. 7 is a graph illustrating the diameter dependence relationship of the nanostrands to conductivity.

FIG. 6 is graph illustrating loss arising in electrical conductivity as mixing time increases, and FIG. 7 is a graph illustrating the diameter dependence relationship of the nanostrands to conductivity.

The larger diameter nanostrands (above about 1500 nm diameter) are very large, and while mechanically robust, are too large to maximize their overall length per unit weight. The smaller diameter nanostrands (below about 100 nm) are too small, and are easily broken and easily separated by surface tension and capillary actions in the polymer matrix during its fluid state.

Once the nanostrands are correctly mixed into the polymer, they can be applied or formed by any number of conventional or unique methods. For example, in one embodiment, the nanostrands can be cast into any number of conventional thermoset or thermoplastic resins by either salvation or melt casting. It is important to keep the viscosity as low as possible at all times during the processing, in order to minimize the shear interactions between nanostrands and the host material. In another embodiment, the nanostrand mixture can be delivered by any conventional paint method, e.g. spraying, rolling, brushing or casting. In a further refinement, the carrier can be either water or solvent based. In a further refinement, the carrier can be water only, by which the water spray can be used to deliver nanostrands in a wet form, then dried to an open porous preform or film, after which the form can be infused with the matrix material.

In review, the high aspect ratio carbon nano materials and branched nickel nanomaterials both achieve their respective levels of percolation at well below 15% volume, and usually achieve their ultimate conductivity at well below 25% volume.

As a result, this low volumetric portion of conductor leaves a good majority of the polymer intact, allowing for lighter weight composites that behave mechanically more like the original polymer, while still achieving the electromagnetic purposes of adding the conductive particles.

A benefit of using less conductive particle and less volume to achieve the same conductive goal as was previously met with other particles is that there is now more volume made free for other additives with other purposes. Thus, the objective of this patent is to teach the art of adding even other types of functional particles to the conductive nanocomposites, thus providing not only for dual functionality (which would be defined for instance, as the lightweight function of a polymer, combined with the electrical conductivity function of an additive), but for tertiary and quaternary functionality, and so forth. This patent applies not only to polymers (such as resins, coatings, adhesives, elastomers, paints and so forth, but also to fiber reinforced composites, wherein the reinforcing fibers add even another dimension of multi-functionality).

For instance, below are listed examples of electrically conductive nanocomposite that may be added:
  a) Whitening agents, such as titanium dioxide, in order to create lighter tints of gray.
  b) Reflective agents, such as metal flakes, in order to create some optical reflection, resulting in a silver gray.
  c) Furthermore, to either of these may then be added a variety of color pigments. While the color pigments do not typically show well when added to the otherwise very dark nanofiber or nanostrand mixtures, their combination with the whitening agents and/or optical reflectors creates a wide array of possible colors.

Other additives that may be added to create additional multi-functionality may include additives that exhibit:

d) High thermal conductivity materials, such as graphite or other recently described high thermal conductivity nano materials.
e) Abrasion resistant materials—such as silicon carbide whiskers
f) Lubricious materials—such as graphite or talc.
g) Fire retardant materials such as clay flakes.
h) Other particles that would add an additional dimension of multi-functionality.

These examples of multiple function compositions are not limited to the specific types of particles mentioned. The examples mentioned here are by way of representative demonstration.

It has been observed that as the amount of these multifunctional additives initially increases, the conductivity of the polymers does not initially start to commensurately deteriorate. But at some threshold mixture, the conductivity does start to deteriorate.

Example 1

Figure 8:
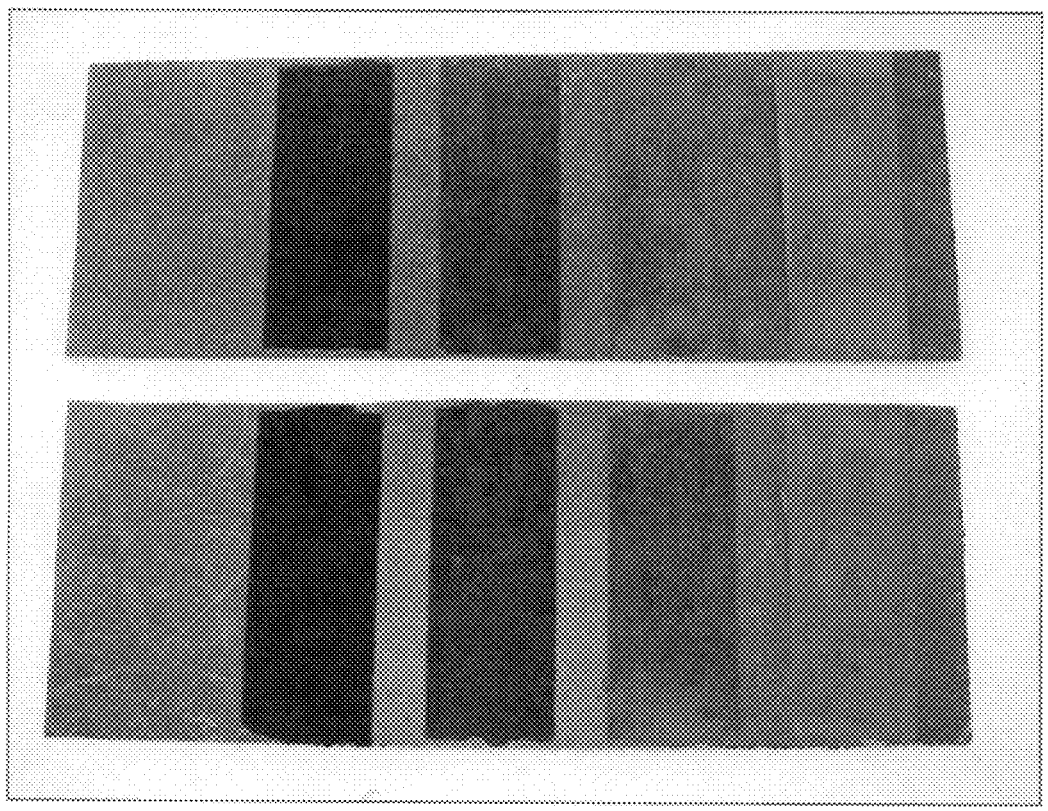
FIG. 8 is a photograph of a rectangular pair of first sample of white-tinted and pigmented nanostrand-in-urethane conductive paints exhibiting surface resistivity of below 1 ohm/square.

FIG. 8 is a photograph of a rectangular pair of first sample of white-tinted and pigmented nanostrand-in-urethane conductive paints exhibiting surface resistivity of below 1 ohm/square. A urethane paint was loaded with nickel powder in order to add electrical conductivity. Whereas the larger diameter, less branched, lower aspect ratio powders may require 50% volume to achieve a given level of conductivity, this same level of conductivity may be achieved with 15% volume of branched nickel nanostrands. Thus, 35% less of the volume has been displaced with a secondary particle, and any additional portion can be used for any number of additional purposes. But at this point, the resulting paint is very dark gray in color. It was found that up to about a 2:1 weight ratio (based on the nickel weight) of titanium dioxide could be added to the paint before the electrical conductivity started to degrade, resulting in a very light gray tint (about like the underside of a cloud, or the sky of an overcast day. Of course, these colors can be spectrally quantified as work progresses.)

Example 2

Figure 9:
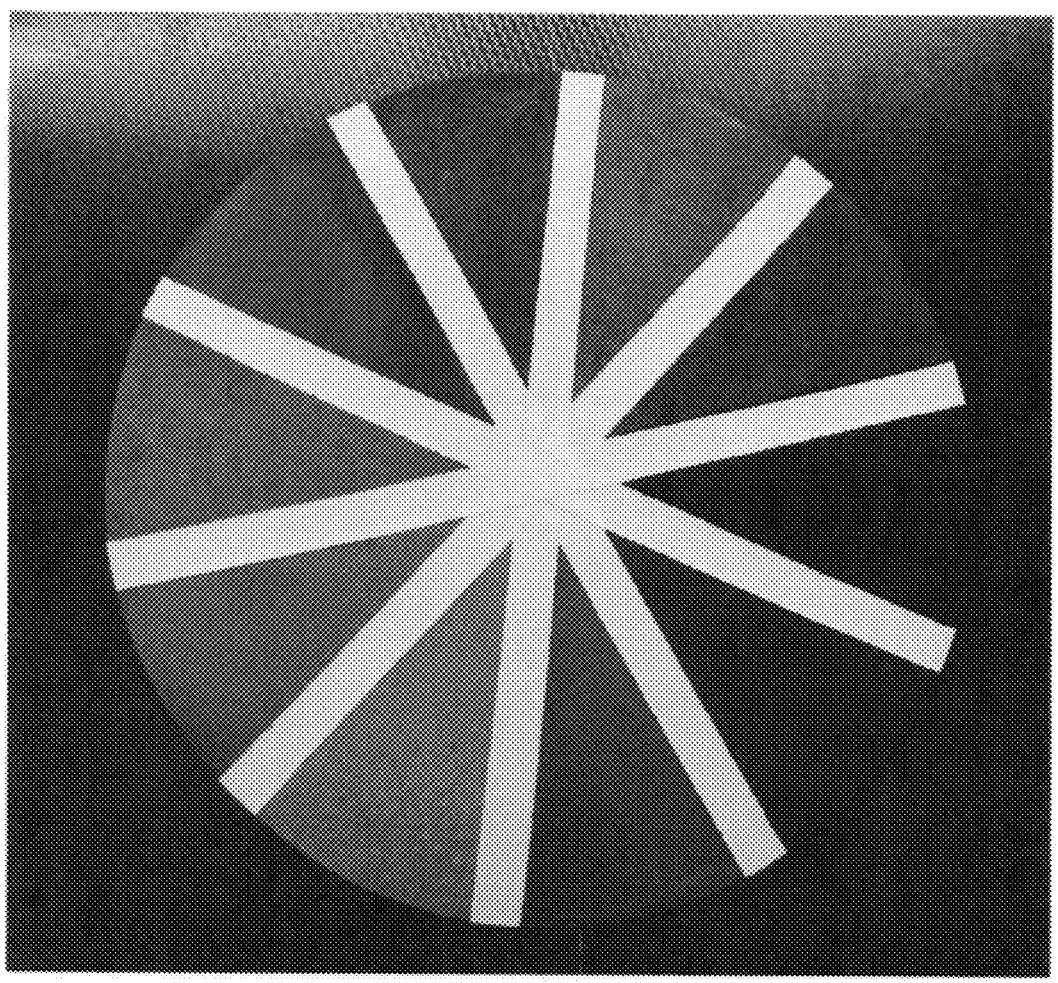
FIG. 9 is a photograph of a circular second sample of white-tinted and pigmented nanostrand-in-urethane conductive paints exhibiting surface resistivity of below 1 ohm/square, wherein the "nanostrand-only" paint is the darkest sample at the three o'clock position on the wheel shown.

FIG. 9 is a photograph of a circular second sample of white-tinted and pigmented nanostrand-in-urethane conductive paints exhibiting surface resistivity of below 1 ohm/square, wherein the "nanostrand-only" paint is the darkest sample at the three o'clock position on the wheel shown.

In the mixture of Example 1, it was found that a portion of the titanium dioxide could be either replaced or supplemented with color pigments. This then resulted in a wide variety of possible hues; most of them being of soft and subtle muted tones, due to the presence of the nanostrands. As with the titanium dioxide, it was found that up to a certain loading, that the conductivity of the paint was not affected. In this example, the urethane/nanostrand mixture, the urethane/nanostrand/tint mixtures and the urethane/nano strand/tint/pigment mixtures all exhibited surface resistivities of less than one ohm per square at coating thicknesses of approximately 0.005 inches.

Example 3

Figure 10:
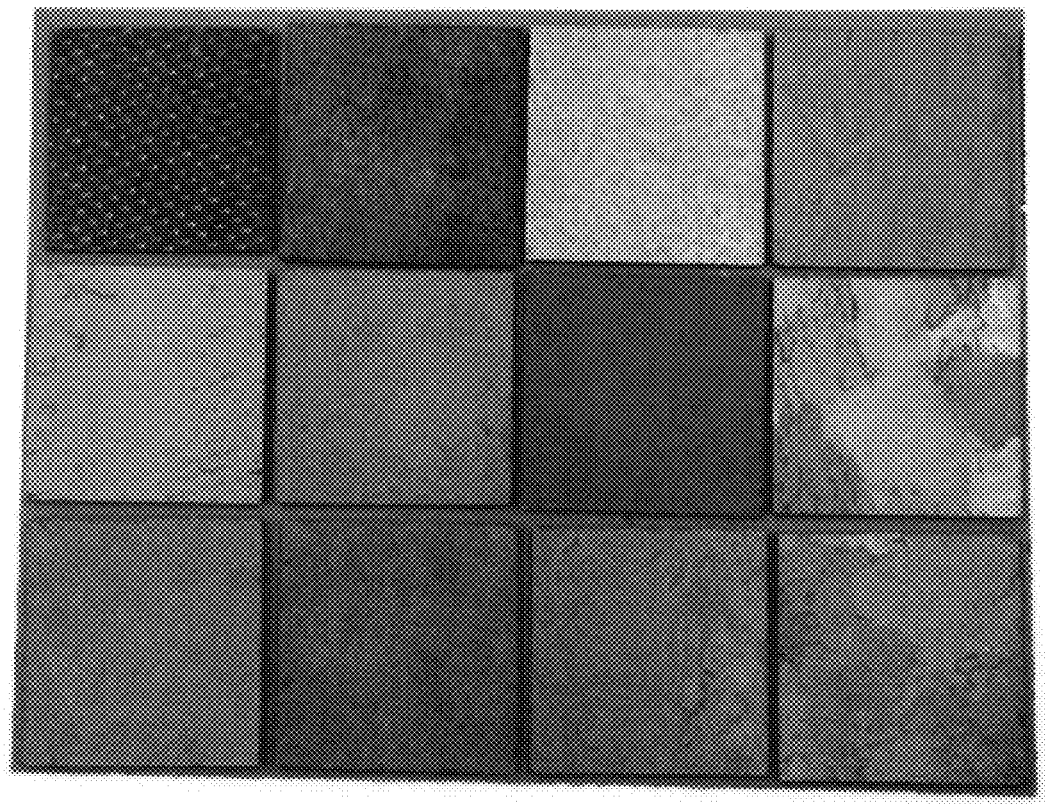
FIG. 10 is a photograph of a checker boarded third sample of white-tinted and pigmented, nanostrand-in-urethane conductive paints exhibiting surface resistivity of below 1 ohm/square, except for the 15 ohms/square plain carbon paint in square in the upper left.

FIG. 10 is a photograph of a checker boarded third sample of white-tinted and pigmented, nanostrand-in-urethane conductive paints exhibiting surface resistivity of below 1 ohm/square, except for the 15 ohms/square plain carbon paint in square in the upper left.

It has previously been learned that the adhesive resins used to bind composite reinforcing fibers may be made highly conductive by the addition of nanostrands. Carbon fiber composites made with these films exhibit surface resistivities usually ranging from 0.1 ohm per square down to 0.005 ohm per square (depending upon the underlying fiber conductivity). These materials are particularly effective for lightning strike and electromagnetic shielding protection. By adding both tints and pigments to the resin in approximately the same ratios as in Example 2, it was found that the resulting composites could be fabricated with highly conductive surfaces of a wide variety of colors and patterns. In all of these cases, the surface resistivity was about 0.1 ohm per square (whereas the surface resistivity of the control carbon composite only panel was about 15 ohm per square).

Furthermore, the unique geometric structure of nanostrands creates a multiplicity of induced interfering electromagnetic fields under electric conduction. Furthermore, the branching, looping, and interconnecting of different sizes, diameters, loop diameters, lengths, etc. of strands creates a further multiplicity of induced electromagnetic fields. These give a benefit of increased conductivity and electromagnetic capabilities. This multiplicity of overlapping nanostrands truly does offer great advantaged in obscuring passing electromagnetic fields.

It is important to preserve the three-dimensional structure of nanostrands throughout the mixing and application process, such that the structure of the clumps of nanostrands is generally preserved. Nanostrands are chains of nickel crystals, and are currently brittle in nature. Excessive mechanical dispersion can break the clumps and individual strands apart. Thus, for nanostrands to be most effective and to utilize most effectively the unique properties of the "cottonballs" structure of nanostrands, they must be mixed properly. If they must be reduced from their bulk as-fabricated format to a more discrete format, it must be done with a minimum amount of shear. Each discrete bundle of powder must adequately maintain its bulk interconnected mass and its branched nature, both internally and externally.

Conductive particles in the forms of spheres or rods are typically a solid particle, or at least a macroscopically solid shell. However, nanostrands are an open structure. The volume of a "cottonball" particle of nanostrands is estimated to be only about 2 to 20% nickel solids by volume. The integrity of this open, interconnected, linked, and looped structure must be preserved as much as possible. This open and looped, yet interconnected and branched structure is the primary reason why nanostrands offer such large performance benefits over existing solid conductive particles, plates and fibers.

These structures consist of individual nanostrands from 50 nm to 4000 nm in diameter. Each of these individual strands may have a multiplicity of side loops of any diameter, branches of any spacing or length, and three dimensional interconnects in any quantity.

Furthermore, the total size of a three dimensional "cottonball" lattice of Nanostrands may range from a diameter in the nanometers to a diameter in the millimeters, more typically in the micron to millimeter range.

The nanostrands may be delivered concurrently with the liquid phase of a polymer matrix, either melted or solvated, by any standard or non-standard means of application. It is also possible to deliver the nanostrands by water only, then letting them dry. At this point, the porous film or perform may be compressed to achieve even better connection, thus better conductivity. At this point, the pre-form is usually 1% to 20% solid, but is optimal at about 2% to 15% solid. This pre-form may then be resin infused by any standard or non-standard method.

Direct contact in-between nanostrand clumps is not necessary to achieve electromagnetic performance benefits. For example, in the presence of an electromagnetic field, the individual strands each can act as an antenna to transmit and receive from other clumps. There are also interaction effects between the nanostrands, individually and collectively as clumps, and the host matrix material.

A further benefit of nanostrands over other conductive particles is that nanostrands fill in negative space versus filling that space with a solid.

The concept of using a sub-micron diameter, high aspect ratio, looped, branched, three dimensionally interconnected, and open (1-50 volume percent solids, preferably 2-20 volume percent) nanostrand particle to impart conductive and electromagnetic properties to a volume consisting of two or more constituents, one these constituents being nanostrands, the other being a polymer or ceramic, the third (or more) being bodies of tertiary functionality.

Open structure nanostrand bodies are of the size in a range of from about 1 micron to about 3000 microns. Nanostrand diameters are in a range of from about 10 nanometers to about 4000 nanometers. The branching and looping is random in nature.

Furthermore, these nanostrands may be composed of a material that adds electromagnetic and corrosion properties, a metal chosen from among the group of metals including nickel, nickel aluminides, iron, iron aluminides, alloys of nickel and iron, and alloys of nickel and copper.

Less volume can be displaced to achieve the same performance levels as current state of the art conductive solid bodied particles. This reduction in displaced volume can lead to weight savings, and/or cost savings, and/or a preservation of more of the base properties of the matrix, and/or the ability to add even more conductive particle to achieve greater performance at the same volume loading as previously used, and/or may leave more available volume for further tertiary functional modification not previously possible.

The aspect ratio, branches, and interconnects work in tandem with the open structure of the particle to provide increased benefits, such as electromagnetic properties, that are not possible with current state of the art solid particles of the same size scale and the same material.

The preservation of the branching and looping in nanostrands drives the correct choice of shear, viscosity and speed properties, as shown in the illustrations.

The matrix material may be any polymer or ceramic.

Nanostrands do not need to be in direct physical contact with neighboring clumps to fulfill their needed purpose of conductivity or electromagnetic properties.

The presence of nanostrands may interact with one or more other materials within a structure to exhibit synergistic effects, in that conductivity and electromagnetic properties will be beyond that expected by the principle of superposition for adding each material individually. For example, nanostrands may interact with the backbone of polymer chains to impart additional conductivity and electromagnetic properties.

The nanostrands may also be delivered by water or other solvent, the water or solvent evaporated or removed, leaving a dry, very open overlapping nanostructure preform. This preform can then be compressed to a desired density or conductivity, and then infused by any standard or non-standard liquid or vapor method.

The present invention contemplates methods for providing an electromagnetically active composite. A number of such methods may be used to produce the composite materials embodying teachings of the present invention. Known methods for composite manufacture may be applied to nanostrand-based composites, as indicated previously. Other methods may alternatively be used to obtain conductivity enhancements or to facilitate manufacturing. Exemplary manufacturing methods will be shown and described in connection with FIGS. 11 and 12.

Figure 11:
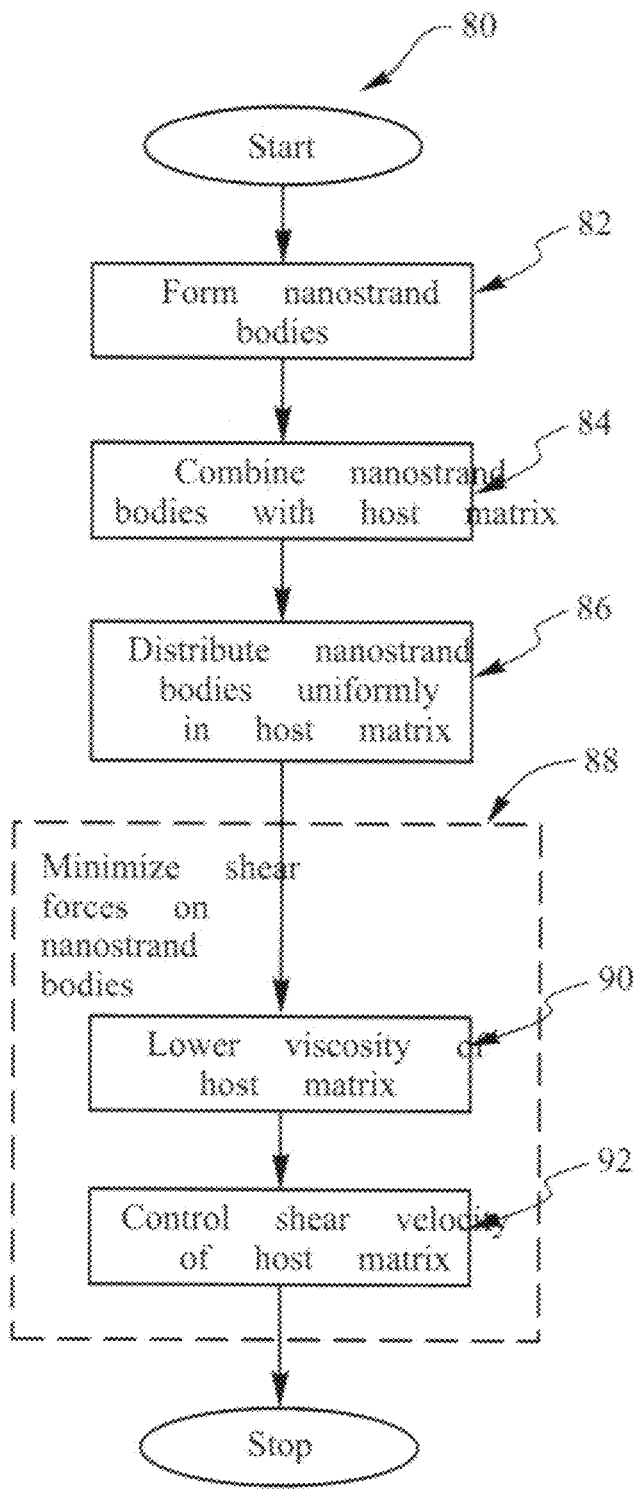
FIG. 11 is a flowchart of steps in a method incorporating teachings of the present invention for imparting electromagnetic activity to an electrically-nonconductive host matrix.

FIG. 11 is a flowchart diagram illustrating an embodiment of a method 80 for imparting electromagnetic activity to an electrically-nonconductive host matrix according to teachings of the present invention. Method 80 commences, as indicated in instruction box 82 with the strep of forming electrically-conductive nanostrand bodies. The nanostrand bodies are then combined with the host matrix, as indicated in instruction box 84. Method 80 continues in instruction box 86 by distributing those nanostrand bodies uniformly throughout the host matrix so that adjacent of the nanostrand bodies are sufficiently mutually proximate to interact electromagnetically.

According to one aspect of method 80, care is taken to minimize shear forces imposed on the nanostrand bodies by the host matrix. A pair of steps by which to effect this objective is included in subroutine box 88. First, as indicated in instructing box 90, these include the step of lowering the viscosity of the host matrix. Second, as indicated in instructing box 92, the step of minimizing shear forces imposed on said nanostrand bodies includes the step of controlling the shear velocity of the host matrix.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A method for imparting electromagnetic activity to an electrically-nonconductive host matrix, the method comprising the steps of:
   forming open structure, electrically-conductive nanostrand bodies, the nanostrand bodies comprise branched, three-dimensional, open chains;
   combining said nanostrand bodies with the host matrix; and
   distributing said nanostrand bodies uniformly throughout the host matrix with adjacent of said nanostrand bodies being sufficiently mutually proximate to interact electromagnetically, and the open chains of the nanostrand bodies remain uncollapsed following the step of combining and the step of distributing.

2. A method as recited in claim 1, further comprising the step of minimizing shear forces imposed on said nanostrand bodies by the host matrix, the step of minimizing shear forces comprises at least one of lowering viscosity of the host matrix and controlling the shear velocity of the host matrix.

3. A method as recited in claim 2, wherein said step of lowering viscosity of the host matrix comprises at least one of increasing temperature of the host matrix and adding a solvent to the host matrix.

4. A method as recited in claim 2, wherein said step of controlling shear velocity comprises at least one of controlling mixing time and controlling mixing speed dependent on the volume of the nanostrand bodies and the host matrix as combined.

5. A method as recited in claim 1, wherein said step of forming is conducted using a metal selected from the group consisting of nickel, nickel aluminides, iron, iron aluminides, alloys of nickel and iron, and alloys of nickel and copper.

6. A method as recited in claim 1, wherein each of said nanostrand bodies comprises a volume containing at least one nanostrand of filamentary metal, said at least one nanostrand has an average diameter in a range of from about 10 nanometers to about 4000 nanometers, and the average diameter of said nanostrand bodies is in a range of from about one micron to about 3000 microns.

7. A method for forming an electrically-conductive preform for use in imparting electromagnetic activity to a composite structure, the method comprising the steps of:
   forming open structure electrically-conductive nanostrand bodies, the nanostrand bodies comprise branched, three-dimensional, open chains;
   suspending said nanostrand bodies in a fluid carrier;
   delivering said nanostrand bodies suspended in said fluid carrier against a forming surface; and
   drying said fluid carrier from said nanostrand bodies delivered against said forming surface.

8. A method as recited in claim 7, further comprising a step of introducing a gelling agent to said fluid carrier.

9. A method as recited in claim 7, wherein said fluid carrier is water.

10. A method as recited in claim 7, wherein said fluid carrier is a solvent.

11. A method as recited in claim 7, wherein said step of forming is conducted using a metal selected from the group consisting of nickel, nickel aluminides, iron, iron aluminides, alloys of nickel and iron, and alloys of nickel and copper.

12. A method as recited in claim 11, wherein each of said nanostrand bodies comprises a volume containing at least one nanostrand of filamentary metal, said at least one nanostrand has an average diameter in a range of from about 10 nanometers to about 4000 nanometers, and the average diameter of said nanostrand bodies is in a range of from about one microns to about 3000 microns.

* * * * *